United States Patent
Mizuuchi et al.

(10) Patent No.: US 8,089,581 B2
(45) Date of Patent: Jan. 3, 2012

(54) DISPLAY AND ILLUMINATOR

(75) Inventors: Kiminori Mizuuchi, Osaka (JP);
Kazuhisa Yamamoto, Osaka (JP);
Shin-ichi Kadowaki, Hyogo (JP);
Tetsuro Mizushima, Osaka (JP);
Akihiro Morikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 816 days.

(21) Appl. No.: 11/997,508

(22) PCT Filed: Jul. 26, 2006

(86) PCT No.: PCT/JP2006/314768
§ 371 (c)(1),
(2), (4) Date: Jan. 31, 2008

(87) PCT Pub. No.: WO2007/015402
PCT Pub. Date: Feb. 8, 2007

(65) Prior Publication Data
US 2010/0103347 A1  Apr. 29, 2010

(30) Foreign Application Priority Data
Aug. 4, 2005  (JP) ................................ 2005-226431

(51) Int. Cl.
*G02F 1/13357* (2006.01)
(52) U.S. Cl. ............ 349/65; 349/61; 362/97.3; 362/613
(58) Field of Classification Search ........................ None
See application file for complete search history.

(56) References Cited

U.S. PATENT DOCUMENTS

| 5,337,068 | A | * | 8/1994 | Stewart et al. | ................. 345/88 |
| 6,023,131 | A | * | 2/2000 | Okita | ............................ 315/291 |
| 6,104,371 | A | | 8/2000 | Wang et al. | |
| 6,151,166 | A | * | 11/2000 | Matsushita et al. | ........... 359/566 |
| 6,351,334 | B1 | * | 2/2002 | Hsieh et al. | .................... 359/571 |
| 6,445,487 | B1 | * | 9/2002 | Roddy et al. | .................. 359/278 |
| 6,464,366 | B1 | * | 10/2002 | Lin et al. | ....................... 362/616 |
| 6,964,500 | B2 | | 11/2005 | Sakai | |
| 7,511,784 | B2 | * | 3/2009 | Ushiro et al. | ................. 349/106 |

(Continued)

FOREIGN PATENT DOCUMENTS
EP   1 146 379   10/2001
(Continued)

OTHER PUBLICATIONS

International Search Report issued Aug. 22, 2006 in the International (PCT) Application of which the present application is the U.S. National Stage.

(Continued)

*Primary Examiner* — Mike Stahl
(74) *Attorney, Agent, or Firm* — Wenderoth, Lind & Ponack, LLP

(57) ABSTRACT

A display for illuminating a liquid crystal display panel with laser light of uniform light quantity distribution, and an illuminator for irradiating with laser light of uniform light quantity distribution. The display includes a liquid crystal display panel (204), laser light sources (205, 206, 207) emitting laser light having wavelengths of green, red, and blue colors, a waveguide plate (201) arranged at the back side of the liquid crystal display panel (204) and performing multiple reflection of laser light, and a diffusion plate (202) arranged at the back side of the waveguide plate (201), diffusing laser light propagating in the waveguide plate (201) and emitting the light toward the liquid crystal display panel (204).

7 Claims, 14 Drawing Sheets

U.S. PATENT DOCUMENTS

| | | |
|---|---|---|
| 2002/0075911 A1* | 6/2002 | Cham et al. ............... 372/29.011 |
| 2002/0196414 A1* | 12/2002 | Manni et al. ..................... 353/31 |
| 2003/0063062 A1* | 4/2003 | Tsumura et al. .............. 345/102 |
| 2004/0119908 A1 | 6/2004 | Sakai |
| 2004/0233354 A1 | 11/2004 | Uehara et al. |
| 2005/0123265 A1* | 6/2005 | Kimura .......................... 385/147 |
| 2007/0030690 A1* | 2/2007 | Lester ............................ 362/554 |
| 2007/0171330 A1* | 7/2007 | Hung et al. ..................... 349/65 |
| 2009/0027587 A1* | 1/2009 | Itoh et al. ........................ 349/61 |

FOREIGN PATENT DOCUMENTS

| | | | | |
|---|---|---|---|---|
| JP | 61-217084 | | | 9/1986 |
| JP | 6-148635 | A | * | 5/1994 |
| JP | 6-325607 | A | * | 11/1994 |
| JP | 9-325336 | A | * | 12/1997 |
| JP | 10-288782 | | | 10/1998 |
| JP | 11-237631 | | | 8/1999 |
| JP | 2000-356757 | | | 12/2000 |
| JP | 2001-189520 | A | * | 7/2001 |
| JP | 2002-62582 | A | * | 2/2002 |
| JP | 2002-122864 | | | 4/2002 |
| JP | 2002-169480 | | | 6/2002 |
| JP | 2002-333619 | | | 11/2002 |
| JP | 2003-270446 | | | 9/2003 |
| JP | 2003-272428 | | | 9/2003 |
| JP | 2003-302918 | | | 10/2003 |
| JP | 2004-29141 | | | 1/2004 |
| JP | 2004-199968 | | | 7/2004 |
| JP | 2004-226709 | A | * | 8/2004 |
| JP | 2005-157025 | | | 6/2005 |
| WO | WO 2005/088364 A1 | | * | 9/2005 |
| WO | WO 2006/059264 A1 | | * | 6/2006 |

OTHER PUBLICATIONS

Patent Cooperation Treaty (PCT) International Preliminary Report on Patentability, issued Feb. 5, 2008 in International Application No. PCT/JP2006/314768.

* cited by examiner

Fig.1A
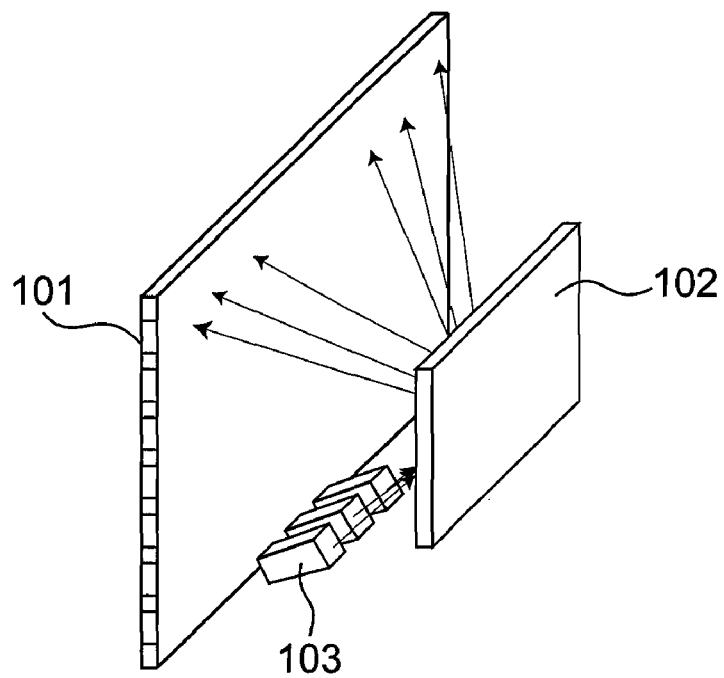
Fig.1B
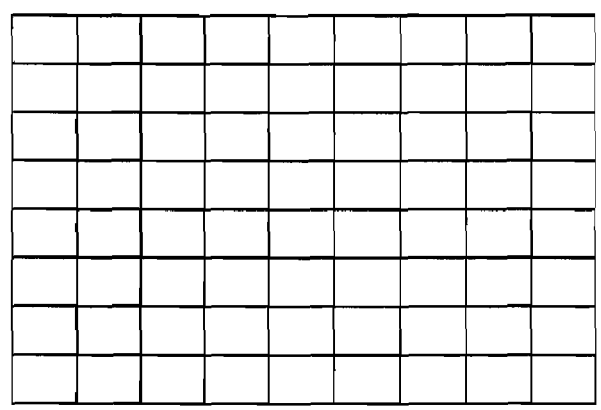 

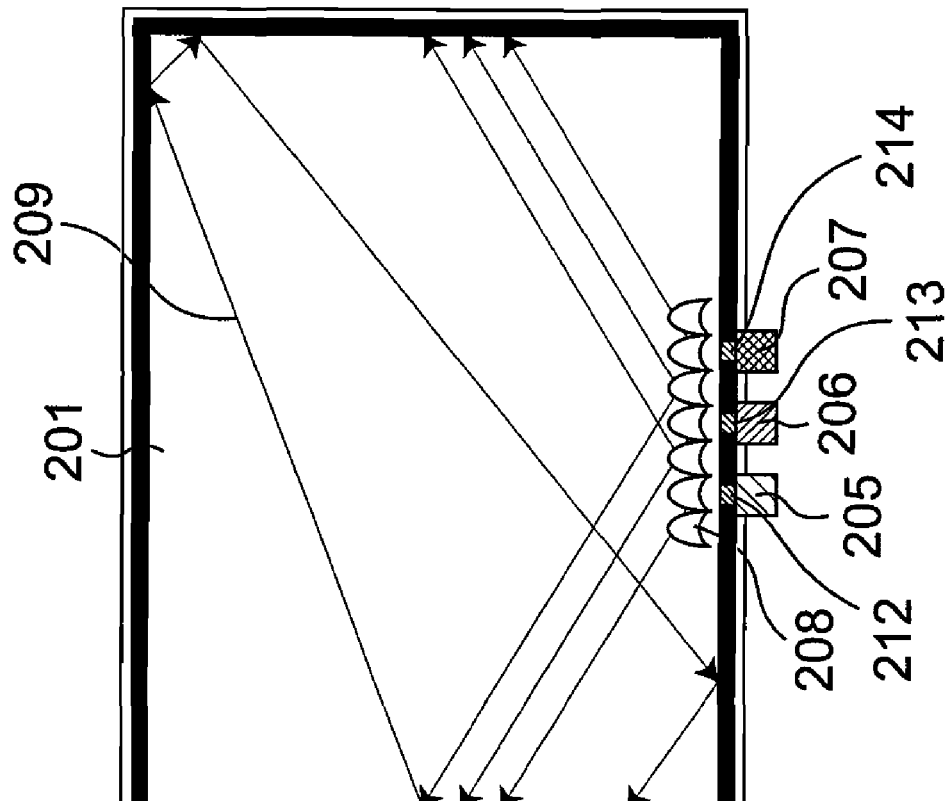
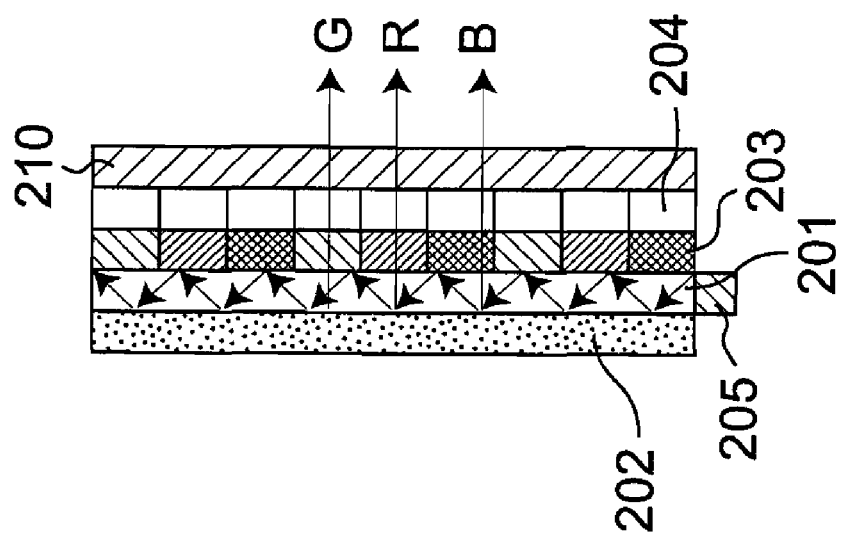

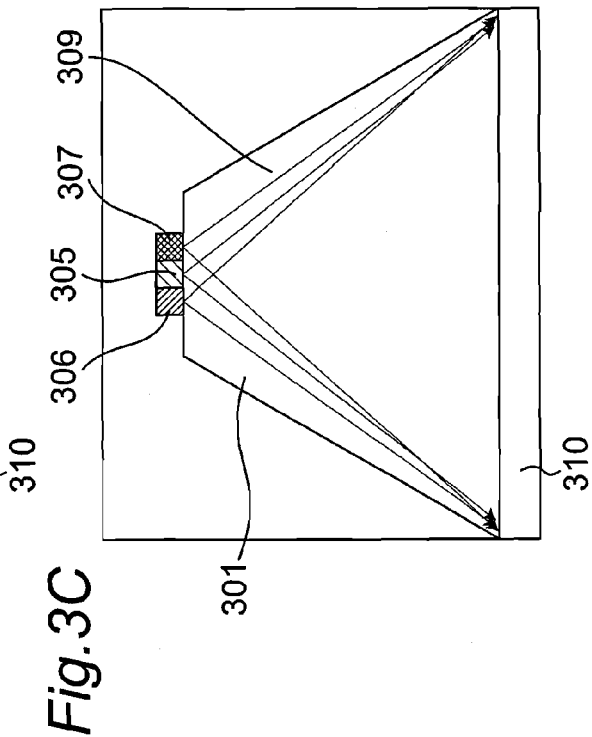
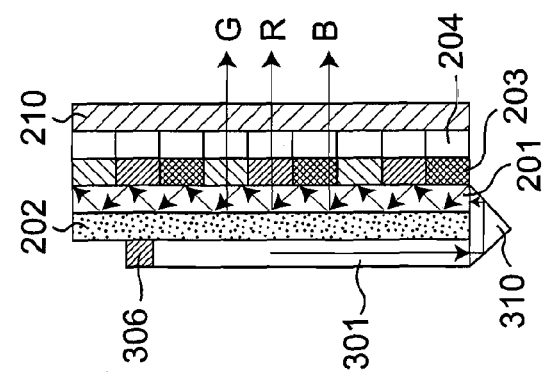
Fig.3A
Fig.3B
Fig.3C

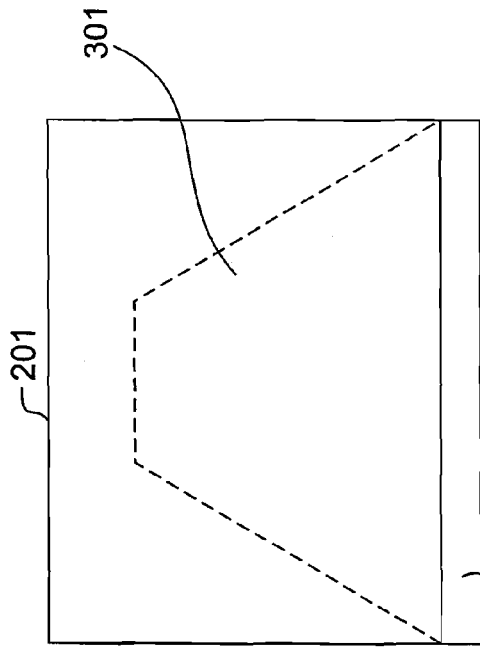
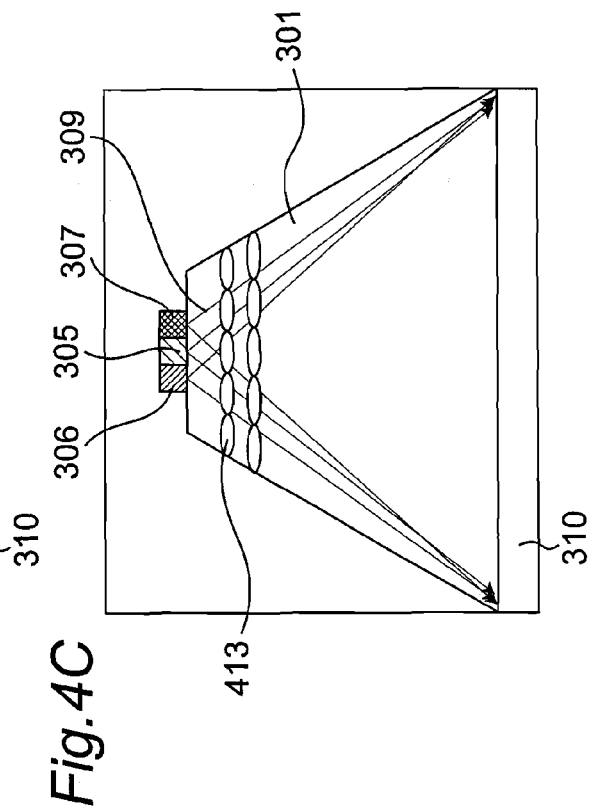
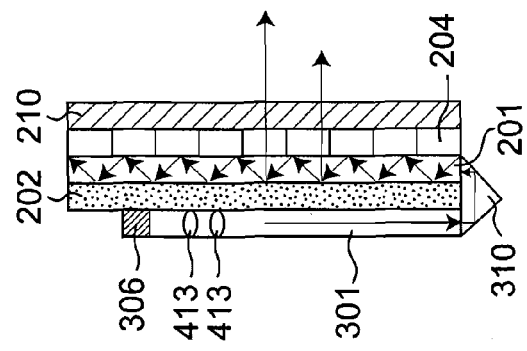

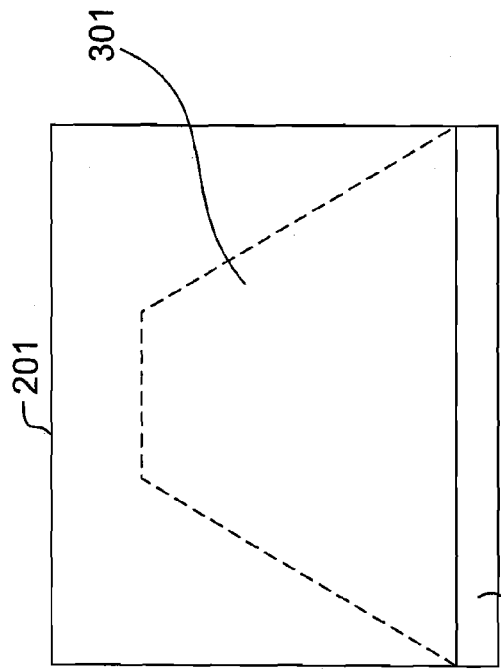
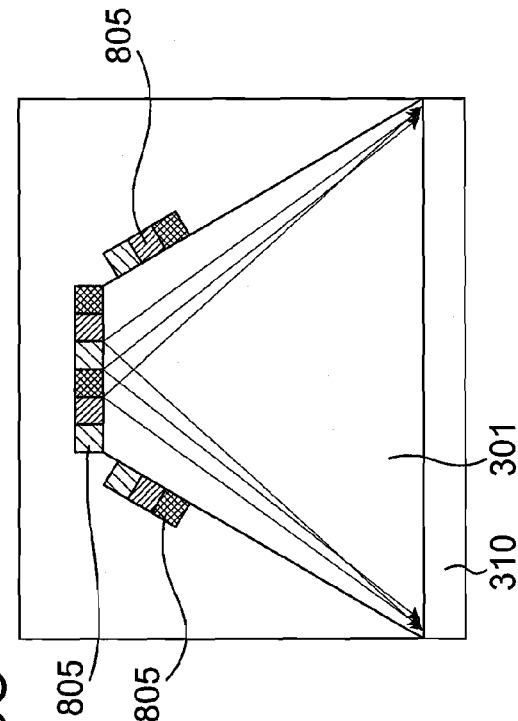
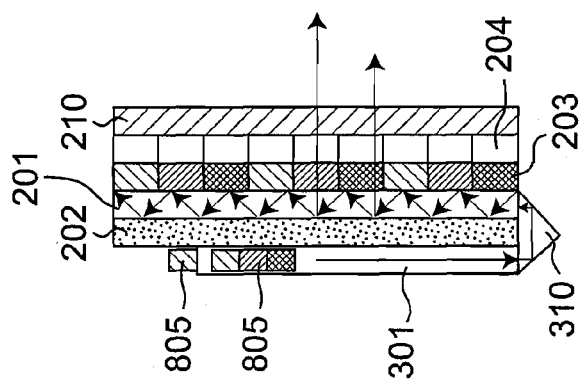
Fig.8B
Fig.8C
Fig.8A

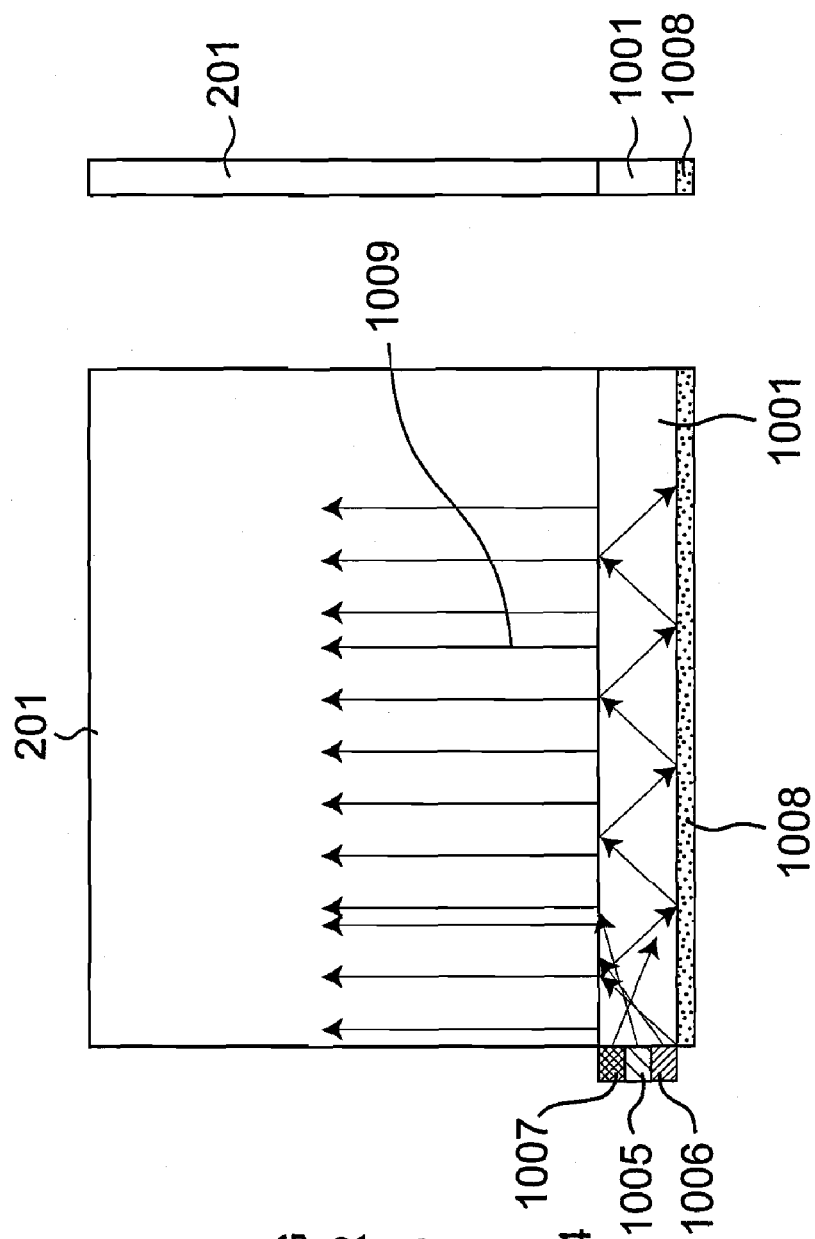
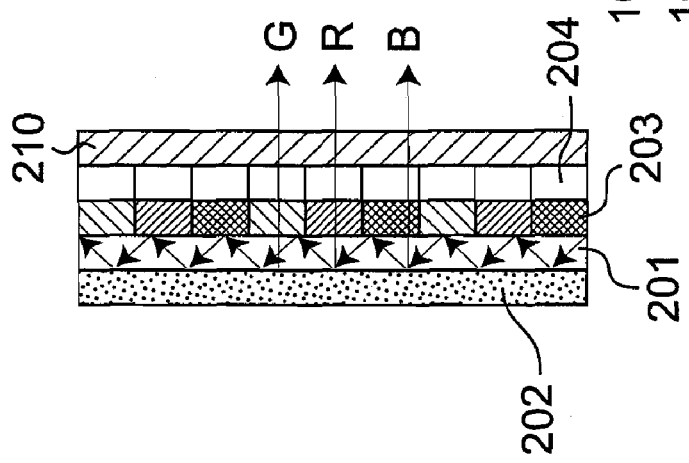

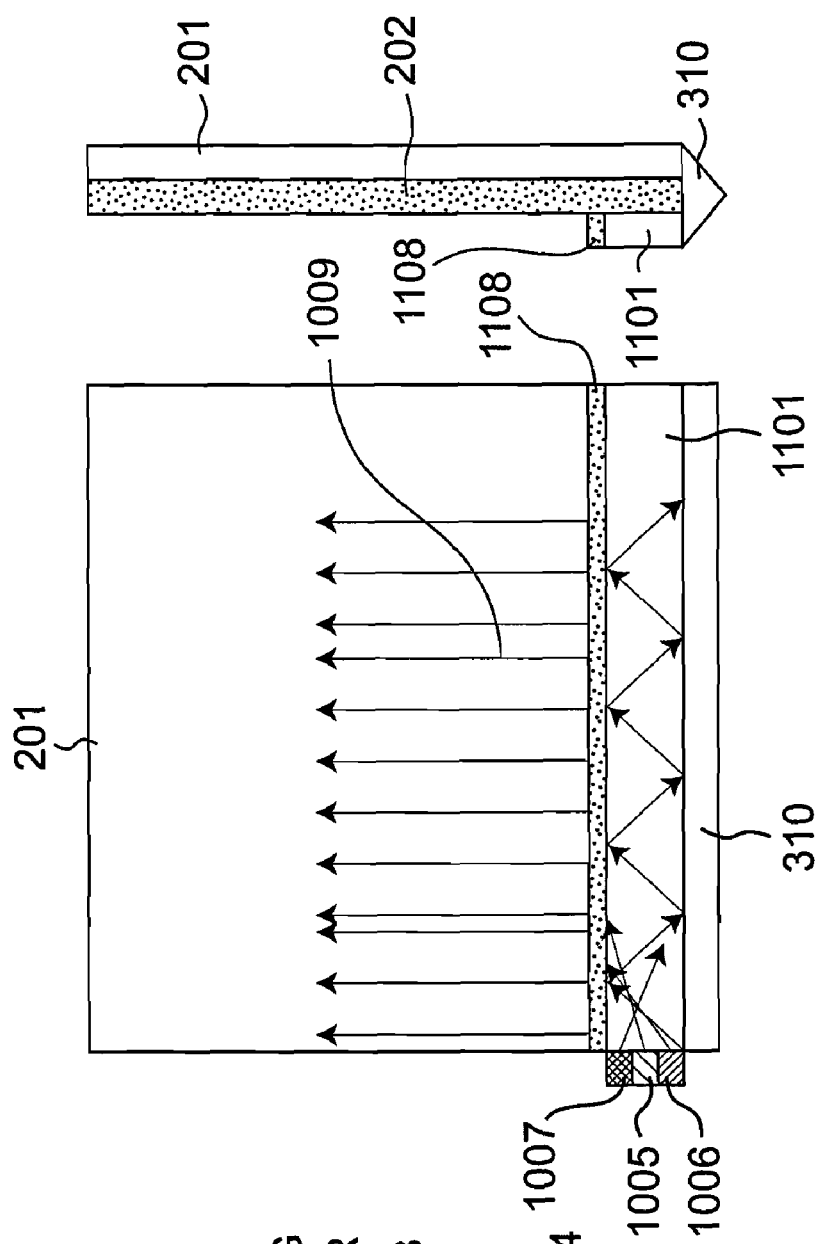

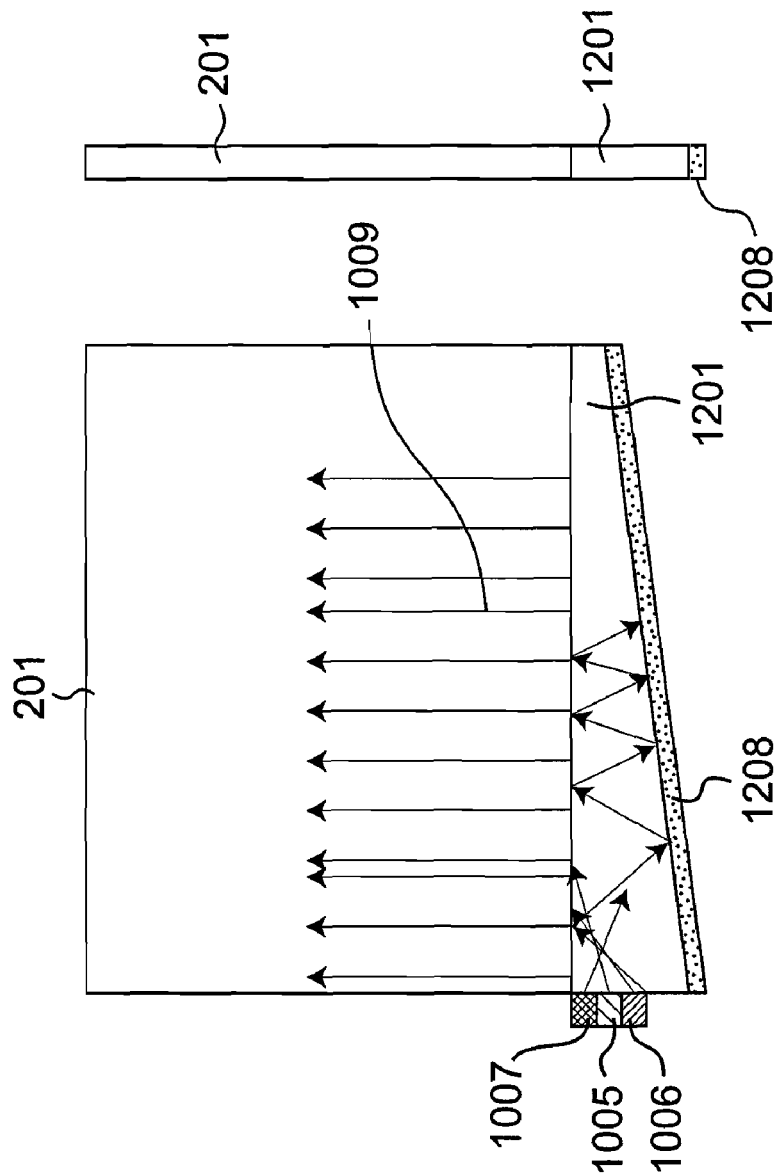
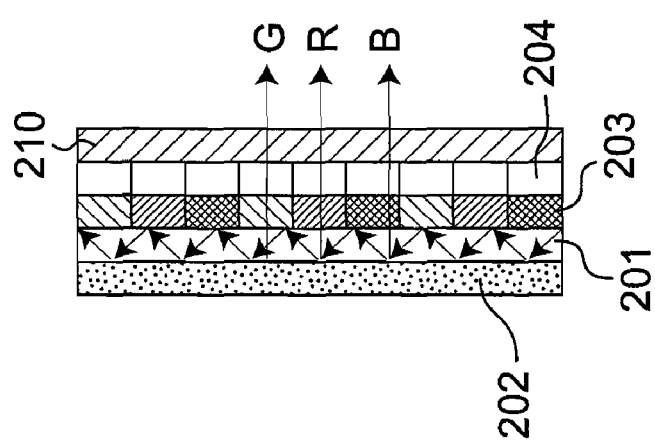

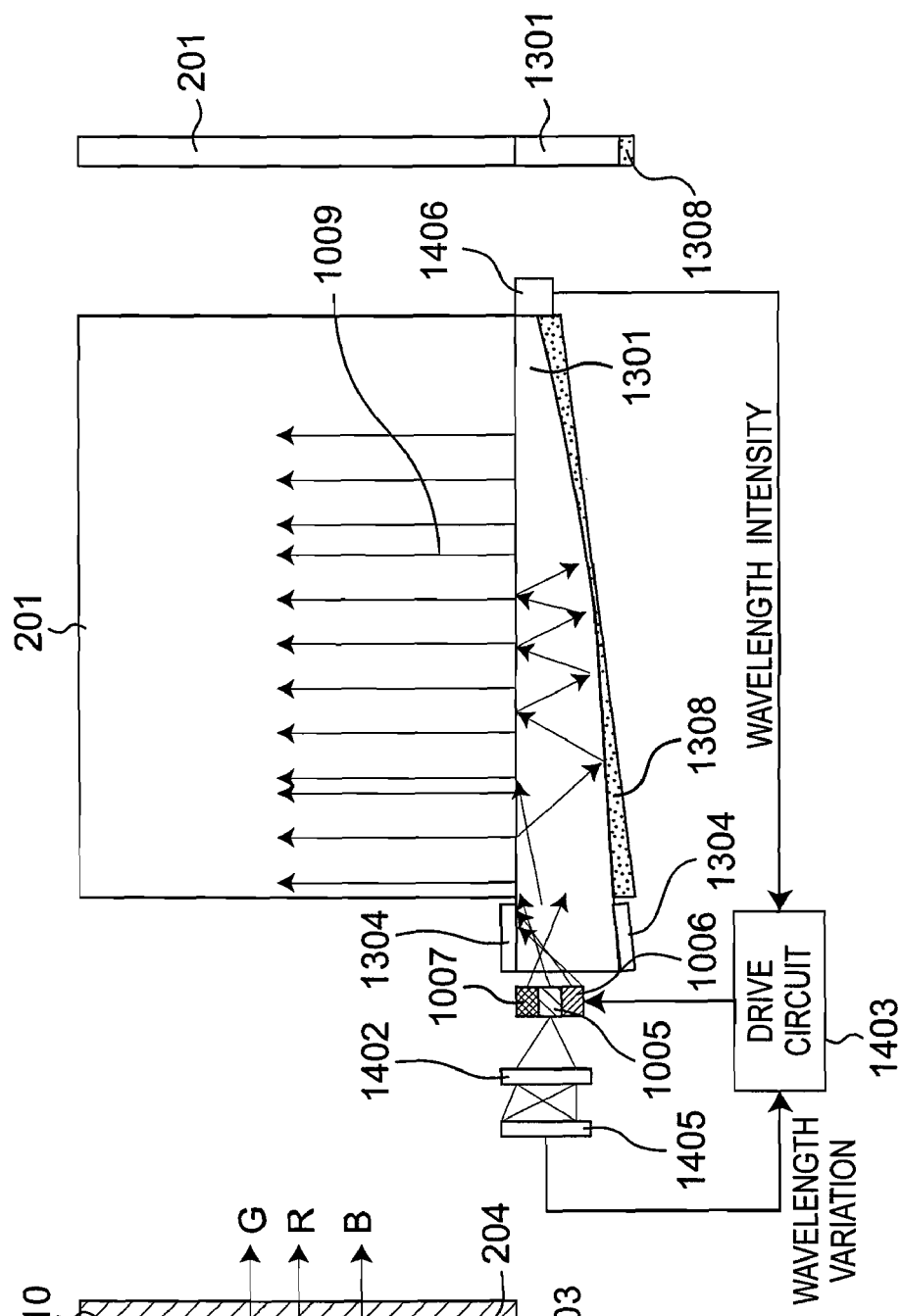

DISPLAY AND ILLUMINATOR

BACKGROUND OF THE INVENTION

1. Technical Field

The invention relates to a display using laser light, and an illuminator for emitting laser light.

2. Description of Related Art

A display using a liquid crystal display panel requires a backlighting for illuminating the liquid crystal display panel. A conventional display has a fluorescent tube or light emitting diode (LED) as a backlighting, but the fluorescent tube or LED is large in luminous point size, and the light use efficiency is only several percent, and the power consumption is very large.

Recently, in order to save the power consumption and lower the cost, it is proposed to use laser light high with light use efficiency as a backlighting of the display.

For example, JP-A-2003-302918 discloses a luminous display for color display by wavelength converting the laser light to illuminating light of fluorescent tube. The luminous display uses a fluorescent luminous layer that performs secondary emission by excited illumination of the laser light. However, when the laser light is converted to the fluorescent light, the power consumption is increased because the electric-optical conversion efficiency is not so high.

A liquid crystal display capable of suppressing this power consumption is disclosed by JP-A-2005-157025. This document proposes an array of surface emission type semiconductor laser chips disposed at the back side of the liquid crystal display panel so as to correspond to each pixel. Further, JP-A-2005-157025 discloses a liquid crystal display in which an angle of reflection plane of a reflector is adjusted in order to incident laser light to each pixel of a liquid crystal display panel, and laser light from a light source enters in each pixel by way of the reflector.

SUMMARY OF THE INVENTION

The liquid crystal display of JP-A-2005-157025 suppresses the power consumption. However, the display cannot emit a uniform light quantity of the laser light to the liquid crystal display panel.

The invention is intended to solve the problems of the prior arts, and it is hence an object thereof to present a display capable of making uniform light quantity distribution in the plane to emit laser light to the liquid crystal display panel, and an illuminator capable of emitting a uniform light quantity of laser light.

A display of the invention includes a liquid crystal display panel, a reflector having a surface on which a grating structure is formed, and a laser light source that emits laser light having wavelengths of red, blue and green, in which the laser light emitted from the laser light source are reflected by the reflector to irradiate the liquid crystal display panel.

A display of the invention may have other configuration. The display of other configuration includes a liquid crystal display panel, a laser light source that emits laser light having wavelengths of red, blue and green, a first waveguide plate arranged at the back side of the liquid crystal display panel, which performs multiplex reflection of the laser light, and a diffusion plate arranged at the back side of the first waveguide plate, which diffuses the laser light propagating in the first waveguide plate to emit the light toward the liquid crystal display panel.

A reflection film reflecting the laser light may be arranged at the lateral side of the first waveguide plate.

An entrance not surrounded by the reflection film may be provided in part of the lateral side of the first waveguide plate, such that the laser light may enter the first waveguide plate through the entrance.

Preferably, the area of the entrance is 1/1000 or less of the total area of the lateral side of the first waveguide plate.

A plurality of entrances may be provided, a film reflecting light other than specific light may be formed on each entrance. In this case, laser light having wavelength of red, blue or green, respectively enters different entrances through films, respectively.

The display may further include a wavelength plate arranged between the liquid crystal display panel and first waveguide plate. The wavelength plate selects the wavelength of the laser light emitted from the laser light source to output the laser light.

The display may further include a second waveguide plate arranged at the back side of the diffusion plate. In this case, the laser light of the laser light source enters the second waveguide plate and then enters the first waveguide plate through the second waveguide plate.

The laser light source may modulate the intensity of laser light of red, blue and green in synchronization with switching of liquid crystal display panel.

The display may further include an optical element that modulates at least one of polarization, deflection and focal point of the laser light. In this case, at least one of polarization, deflection and phase of laser light is changed temporally.

The optical element may be formed as part of the first waveguide plate or the second waveguide plate.

The laser light source having wavelengths corresponding to red, blue and green may have a plurality of luminous points.

The wavelengths of light emitted from the plurality of luminous points may be slightly different from each other. The difference of wavelengths may be 1 nm or more.

The laser light source may include a plurality of light sources, and the plurality of light sources may be arranged at the back side of the liquid crystal display panel at an interval more than a specific interval. In this case, preferably, each power consumption of the plurality of laser light sources is not more than 2 W.

At least one of the plurality of laser light sources may be superposed at high frequency.

The display may further include a waveguide tube that propagates the laser light emitted from the laser light source, in which the laser light is propagated from the waveguide tube to the first waveguide plate.

The waveguide tube may be arranged at the lateral side of the first waveguide plate.

Or, the waveguide tube may be arranged at the back side of the first waveguide plate.

The waveguide tube may be formed in a taper shape.

The taper shape may be curved shape.

Preferably, the length of the waveguide tube is longer than the length of the first waveguide plate.

The display may further include a detector that detects the quantity of the laser light of the waveguide tube or the laser light source.

The display may further include a diffraction element, in which the detector detects a diffracted light from the diffraction element.

The display of the invention may have other configuration, and the display of other configuration includes a liquid crystal display panel, a laser light source that emits laser light having wavelengths of red, blue and green, a plurality of first waveguide tubes arranged at the back side of the liquid crystal display panel, which propagates the laser light emitted from the laser light source for each wavelength, and a diffusion plate arranged at the back side of the plurality of first waveguide tubes, which diffuses the laser light propagating in the first waveguide tubes to emit the laser light toward the liquid crystal display panel.

The display may further include a plurality of second waveguide tubes arranged at the back side of the diffusion plate, in which the second waveguide tubes separate the laser light of red, blue and green emitted from the laser light source based on each wavelength to allow each separated laser light into each one of the plurality of the first waveguide tubes.

The plurality of first waveguide tubes may include three waveguide tubes each propagating the laser light of red, green or blue, respectively, and each waveguide tube may be folded back at both ends of the liquid crystal display panel.

An illuminator of the invention includes a laser light source that emits laser light having a plurality of different wavelengths, a waveguide plate that perform multiplex reflection of the laser light, and a diffusion plate arranged at the back side of the waveguide plate, which diffuses the laser light propagating in the waveguide plate to emit the laser light from the surface of the waveguide plate.

An illuminator of the invention may have another configuration, and the illuminator of another configuration includes a laser light source that emits laser light having a plurality of different wavelengths, a plurality of waveguide tubes each propagating the laser light emitted from the laser light source for each wavelength, and a diffusion plate arranged at the back side of the plurality of waveguide tubes, which diffuses the laser light propagating in the plurality of waveguide tubes to emit the laser light from the surface of the waveguide tubes.

The invention realizes a display that uniformizes the light quantity distribution of laser light and emits the laser light to the liquid crystal display panel, and an illuminator that uniformizes and emits the laser light.

BRIEF DESCRIPTION OF THE DRAWINGS

FIG. 1A is a configuration diagram of a display in embodiment 1 of the invention.

FIG. 1B is a diagram showing a rectangular diffusion plate.

FIGS. 2A and 2B are configuration diagrams of a display in embodiment 2 of the invention.

FIGS. 3A, 3B and 3C are configuration diagrams of a display in embodiment 3 of the invention.

FIGS. 4A, 4B and 4C are configuration diagrams of a display in embodiment 4 of the invention.

FIGS. 8A, 8B and 8C are configuration diagrams of a display in embodiment 8 of the invention.

FIGS. 10A, 10B and 10C are configuration diagrams of a display in embodiment 10 of the invention.

FIGS. 11A, 11B and 11C are configuration diagrams of a display in embodiment 11 of the invention.

FIGS. 12A, 12B and 12C are configuration diagrams of a display in embodiment 12 of the invention.

FIGS. 14A, 14B and 14C are configuration diagrams of a display in embodiment 14 of the invention.

Figure 5B:
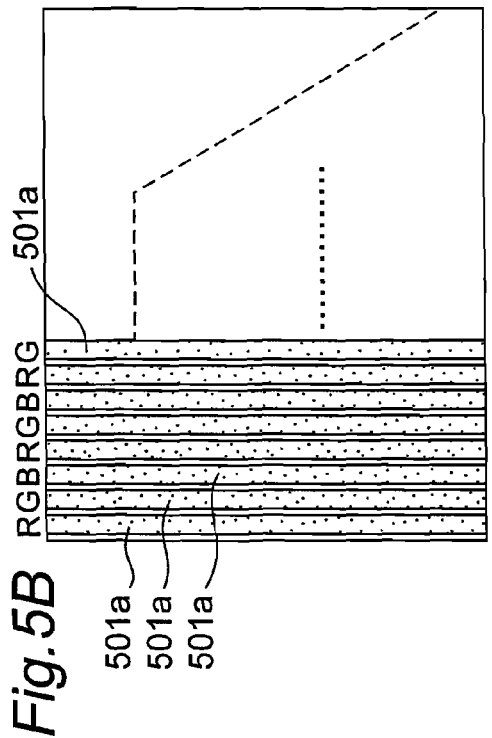
FIGS. 5A, 5B, and 5C are configuration diagrams of a display in embodiment 5 of the invention.

REFERENCE NUMERALS 101, 204, 901 Liquid crystal display panel
102 Reflector
103, 205, 206, 207, 305, 306, 307 Laser light source
805, 902, 1005, 1006, 1007 Laser light source
201, 301 Waveguide plate
202, 612, 1208, 1308 Diffusion plate
203 Filter
208 Microlens array
209 Laser light
211 Reflection film
212, 213, 214 Wavelength selection film
310 Prism
413 Uniformizing optical system
501a, 903, 1001, 1101, 1201, 1301 Waveguide tube
501b Branch waveguide tube
713 Liquid crystal element
1304 Mirror
1402 Diffraction element
1403 Drive circuit
1405, 1406 Detector

DETAILED DESCRIPTION OF THE INVENTION

Embodiments showing the best mode for carrying out the invention are described below by referring to the accompanying drawings.

Embodiment 1

FIG. 1A is a configuration diagram of a display in embodiment 1 of the invention. The display of this embodiment includes a liquid crystal display panel 101, a reflector 102 arranged at the back side of the liquid crystal display panel 101, and a laser light source 103 for emitting laser light of red color (R), green color (G), and blue color (B) to the reflector 102.

The laser light source 103 is a fiber laser emitting laser light. The reflector 102 is a flat plate, which reflects the laser light emitted from the laser light source 103, and emits the laser light to the liquid crystal display panel 101. A reflection type grating structure is formed on the surface of the reflector 102. The grating in this embodiment is a computer-generated hologram determined by calculation. This grating is designed so that the distribution of diffused light may form a rectangular shape similar to the liquid crystal display panel 101. Accordingly, the light distribution in the liquid crystal display panel 101 is made uniform. Since the laser light is narrow in wavelength spectrum, a diffraction element can be used. By forming a grating structure, the diffraction pattern of laser light is emitted uniformly on the liquid crystal display panel 101. The liquid crystal display panel 101 converts the emitted laser light into a two-dimensional image.

Since the laser light is high in coherence, the grating can be utilized as in this embodiment. By forming a grating structure on the surface of reflector 102, light quantity distribution can be made uniform by a simple optical system, and the liquid crystal display panel 101 can be illuminated uniformly.

The type of grating is not limited to the structure of the embodiment, and, for example, a rectangular diffusion plate 104 may be used as shown in FIG. 1B. FIG. 1B shows a front view and side view of rectangular diffusion plate 104. The rectangular diffusion plate 104 is formed in a tiny rectangular convex shape. The light reflected on the surface of the rectangular diffusion plate 104 becomes a rectangular reflected light, and when the reflected light is overlaid in multiple layers, a rectangular uniform light distribution is realized. When a rectangular light distribution is formed, uneven brightness of light in the liquid crystal plane is eliminated. Hologram and undesired light are less, and the light can be utilized efficiently.

Instead of forming a grating structure on the surface of reflector 102, by using diffusion plate or microlens array, the light quantity distribution of laser light emitted to the liquid crystal display panel 101 may be made uniform.

The invention realizes a two-dimensional display by emitting laser light efficiently from a two-dimensional plane. The electric-optical conversion efficiency of laser light by laser light source 103 is as high as 20% to 40%. Moreover, since the laser light source 103 is high in coherence, only the spectrum of light necessary for color display can be oscillated. Accordingly it is easy to design the optical system, and loss by reflector is small, and a thin optical system of low loss can be designed. The light of high color purity can be used, and the light can be utilized efficiently in display of red, green and blue colors, and high efficiency and low power consumption can be realized at the same time. Hence a display of large screen is realized. In addition, since the power consumption is saved and the size is reduced, it is applicable to a display used in a portable device. By using laser light, color reproducibility is enhanced outstandingly, and color display of high chromaticity is realized. The color range that can be displayed is much wider than the chromaticity range displayed by a conventional fluorescent tube.

Preferably, a filter passing only light of each pixel of liquid crystal display panel 101 is formed on the back side of the liquid crystal display panel 101. Through the filter, laser light is selectively passed to each pixel, and a full-color display is realized.

Instead of using the filter, the output of RGB laser light can be changed over in synchronization with the liquid crystal display panel 101. In this case, high speed response of liquid crystal is needed, but the pixels of liquid crystal are enhanced three times, and pixel display of high density is realized.

In the embodiment, the laser light source 103 is a fiber laser, but not limited to this, a semiconductor laser or a solid-state laser may be also used.

In the embodiment, three laser light sources 103 which emit laser light beams of R, G, and B colors, respectively are used, but a further light source for emitting other color light may be used. For example, by adding other light source of other color in order to emit four colors, the chromaticity range to be expressed can be widely expanded, and color reproducibility may be enhanced.

In the embodiment, one reflector 102 is used for thin design of display, but a plurality of reflectors 102 may be used. In this case, by multiplex reflection of a plurality of reflectors 102, light quantity distribution of laser light emitted to the liquid crystal display panel 101 can be made uniform. As a result, a large screen display is realized in thin type optical system.

Embodiment 2

FIGS. 2A and 2B show a display in the embodiment 2 of the invention. FIG. 2A is a side view of the display, and FIG. 2B is a front view. As shown in FIG. 2B, the display of the embodiment includes laser light sources 205, 206, 207 for emitting green, red, and blue laser light 209, respectively, a waveguide plate 201 for receiving and guiding laser light 209 of laser light sources 205, 206, 207, a reflection film 211 provided at the surrounding side of waveguide plate 201, a microlens array 208 for guiding the laser light 209 into the waveguide plate 201, and wavelength selection films 212, 213, 214 provided between the laser light sources 205, 206, 207, and a microlens array 208.

As shown in FIG. 2A, the display of the invention further includes a diffusion plate 202 which is arranged at the back side of the waveguide plate 201 and properly diffuses the guided light of the waveguide plate 201, a filter 203 provided on the surface of the waveguide plate 201, a liquid crystal display panel 204 which is provided at the surface side of the filter 203 and converts the laser light passing through the filter 203 into an image, and a polarizer 210 provided on the upside of the liquid crystal display panel 204.

In this configuration, the display of the embodiment converts the laser light 209 into two-dimensional color image by the liquid crystal display panel 204.

In order to guide the laser light 209 from the laser light sources 205, 206, 207 into the waveguide plate 201, an entrance removing a part of the reflection film 211 is provided between the laser light sources 205, 206, 207 and the waveguide plate 201, and wavelength selection films 212, 213, 214 provided on the entrance. The wavelength selection film 212 provided for the green color laser light source 205 passes the green color laser light, and reflects the red and blue color laser light. The wavelength selection film 213 provided for the red color laser light source 206 passes only the red color laser light, and reflects the green and blue color laser light. The wavelength selection film 214 provided for the blue color laser light source 207 passes only the blue color laser light 209, and reflects the red and green color laser light. The laser light 209 from the laser light sources 205, 206, 207 enters the microlens array 208 in the waveguide plate 201 through the wavelength selection films 212, 213, 214.

The microlens array 208 diffuses the incoming laser light 209 in the waveguide plate 201 in a direction parallel to the principal plane of waveguide plate 201. The laser light 209 diffused by the microlens array 208 propagates in the waveguide plate 201. By providing the microlens array 208, the laser light 209 is diffused in a short distance, and the scattering intensity of laser light 209 is made uniform within the plane of the waveguide plate 201.

The reflection film 211 provided around the waveguide plate 201 almost totally reflects the laser light 209 entering the waveguide plate 201. The laser light 209 is reflected totally and propagates in the waveguide plate 201, so that the laser light 209 becomes a planar light.

The laser light 209 propagating in the waveguide plate 201 is partly scattered in the surface direction by the diffusion plate 202 provided at the back side of the waveguide plate 201. The laser light 209 scattered in the surface direction is entered in the filter 203. The filter 203 provided on the surface of the waveguide plate 201 passes only the selected wavelength, and reflects other wavelength. That is, the filter 203 passes the laser light 209 of the wavelength corresponding to the pixel of the liquid crystal display panel 204. The liquid crystal display panel 204 modulates the intensity of the laser light passing through the filter 203, and converts into an image. The laser light 209 reflected by the filter 203 and not radiated to outside from the liquid crystal display panel 204 propagates in the waveguide plate 201.

According to the configuration of the invention, the laser light 209 is folded and reflected by the reflection film 211. The laser light 209 is multiplex reflected in the waveguide plate 201, and is guided continuously. As a result, light intensity distribution in the waveguide plate 201 is made uniform. By repetition of multiplex reflection in the plane of the waveguide plate 201, loss of light at the lateral side of the waveguide plate 201 is eliminated, and the light can be utilized efficiently.

In the embodiment, the total area of entrance is 1/1000 or less of the total area of lateral side of waveguide plate 201. Accordingly, leak of laser light reflected in multiplex on the lateral side of the waveguide plate 201 is suppressed to 0.1% or less. Further, occurrence of uneven brightness of waveguide plate 201 near the entrance can be decreased.

The laser light 209 emitted from the laser light sources 205, 206, 207 is high in luminance and very small in luminous point, being about 100 um, unlike the LED or lamp light source, and hence the laser light 209 can enter the waveguide plate 201 through the tiny entrance being a incident port. Therefore, the area of the entrance may be extremely reduced. By setting the entrance area of coupling of laser light 209 and waveguide plate 201 at 1% or less of the total area of lateral side of waveguide plate 201, leak loss of laser light 209 repeating multiplex reflection from lateral side can be substantially decreased. By forming reflection film 211 at the lateral side of waveguide plate 201 excluding the entrance, the coupling efficiency with the waveguide plate 201 becomes as high as 95% or more. In the display using conventional LED or fluorescent tube, the coupling area with the waveguide plate is very wide, and when total reflection at the lateral side of the waveguide plate is utilized, the reflected light is radiated to the light source side, and the loss is very large. By using the laser light sources 205, 206, 207 as in the embodiment, the loss of light at the lateral side of the waveguide plate 201 is 1/100 or less, and the loss is decreased substantially.

By providing the wavelength selection films 212, 213, 214, leak of laser light of other wavelength at entrance can be further decreased, and the efficiency of using laser light is increased substantially. At the same time, uniformity of light in the waveguide plate 201 is enhanced.

Thickness of waveguide plate 201 in the embodiment is a parallel flat plate, but the waveguide plate 201 may be tapered in thickness. To enhance the uniformity of light within a plane of the display, the waveguide plate 201 may be tapered, and the scatter of laser light 209 may be made uniform.

By using the laser light 209, the waveguide plate 201 can be reduced in thickness. In the backlight using the conventional fluorescent tube or LED, the thickness of waveguide plate was required to be several millimeters. This is because the luminous area of the fluorescent lamp or LED is in the unit of millimeters, and the coupling efficiency with the waveguide plate is substantially lowered unless the thickness of the waveguide plate is sufficiently large. By contrast, the luminous area of laser light is very small, about several μm multiplied by several hundred μm. Accordingly, when the thickness direction of laser active layer is aligned with the thickness direction of waveguide plate, the luminous area of laser light 209 is several units of um, and as far as the thickness of waveguide plate 201 is 10 um or more, coupling with laser light is realized at a high efficiency of 90% or more. Hence, by using the laser light 209, the waveguide plate 201 can be reduced in thickness. The light use efficiency is much enhanced, and the power consumption can be further lowered.

In the configuration using the laser light 209, it is preferred to incline slightly the exit end side of laser light of laser light sources 205, 206, 207, and the incident side of the waveguide plate 201. As a result, it is effective to prevent breakdown of end face of laser light sources 205, 206, 207, or unstable output of laser light due to feedback of reflected light from the end face of the waveguide plate 201 to the laser light sources 205, 206, 207. Further, in order to totally reflect the laser light 209 at the lateral side of the waveguide plate 201 and uniformize the light quantity in the waveguide plate 201, the laser light 209 may be allowed to enter obliquely to the waveguide plate 201, so that an efficient total reflection is realized.

In the embodiment, the diffusion plate 202 is arranged at the back side of the waveguide plate 201, but undulations may be formed directly on the back side of the waveguide plate 201 as the diffusion plate 202. As a result, the number of components is saved, the cost is lowered. By using the laser light 209, a special design of diffusion plate 202 is possible. Since the laser light 209 is high in coherence, a diffraction structure using a periodic structure can be applied in the pattern of the diffusion plate 202. Hence, by diffusing only a specific wavelength selectively forward, the scatter direction can be controlled based on the wavelength of light. By reducing the film thickness of diffusion plate 202, the diffusion comes to have a dependence on wavelength, and a desired wavelength can be selectively supplied to each pixel of liquid crystal display panel 204, and the light use efficiency can be enhanced. It may also play the role of wavelength filter 203, and it is further effective to lower the cost.

In the embodiment, since the laser light 209 is used, the selection wavelength of filter 203 is limited to three wavelengths of R, G and B. Spread of each spectrum of laser light 209 is a narrow band of about several unit of nm, and the selection ratio of filter 203 for selecting the wavelength can be enhanced, and the extinction ratio is increased outstandingly. By using the laser light 209, designing of filter 203 is easier and the cost is saved. Further, the light use efficiency is enhanced, and driving at low power consumption is possible.

In the embodiment, the light quantity in the waveguide plate 201 is made uniform by using the microlens array 208, but same effects are obtained by using diffusion plate, grating, prism array, and other optical elements instead of microlens array 208.

Embodiment 3

FIGS. 3A-3C show a display in embodiment 3 of the invention. FIG. 3A is a side view of the display, FIG. 3B is a front view, and FIG. 3C is a back view. The display of the embodiment includes, in addition to the configuration of embodiment 2, a trapezoidal waveguide plate 301 provided at the back side of the diffusion plate 202, and a rectangular prism 310 for coupling the waveguide plate 301 and the waveguide plate 201.

In the embodiment, laser light sources 305, 306, 307 for emitting laser light of green color, red color, and blue color, respectively are provided at the lateral side of the waveguide plate 301, and the laser light 309 emitted from the laser light sources 305, 306, 307 is made uniform in the waveguide plate 301. The laser light 309 propagating in the waveguide plate 301 is reflected by the prism 310, and is supplied into the waveguide plate 201.

A certain distance is needed to uniformize the light quantity in the waveguide plate 201, and, for example, in order to uniformize the light quantity in the configuration in FIGS. 2A and 2B of embodiment 2, the area of the waveguide plate 201 must be wider than the area of the liquid crystal display panel 204. In this embodiment, the waveguide plate 301 is provided at the back side of the waveguide plate 201, and the laser light 309 is folded through the prism 310, and therefore the propagating distance of laser light 309 is assured at the back side of the waveguide plate 201. Hence, the waveguide 201 and liquid crystal display panel 304 are almost same in size, and the display size is reduced.

In the laser light sources 305, 306, 307, the luminous point size is small, and the waveguide plates 201, 301 can be reduced in film thickness. If the waveguide plate is formed of a two-layer structure, the volume increase is very small. Besides, since the laser light 309 is high in coherence, scatter loss in folding prism 310 is also small.

The reflection film 211 in embodiment 2 may be also provided around the waveguide plate 301. By multiplex reflection of laser light at the lateral side of the waveguide plate 301, the light quantity is further made uniform, and the loss of laser light 309 reflected to the side of the waveguide plate 301 by the prism 310 can be substantially decreased.

According to the embodiment, in addition to the effect of embodiment 2, the display can be reduced in size.

Embodiment 4

FIGS. 4A-4C show a display in embodiment 4 of the invention. FIG. 4A is a side view of the display, FIG. 4B is a front view, and FIG. 4C is a back view. The display of the embodiment further includes a uniformizing optical system 413 in the waveguide plate 301. The uniformizing optical system 413 widens the angle of spread of laser light 309. As a result, the in-plane uniformity of laser light in the waveguide plate 301 can be further enhanced.

As shown in FIG. 4A, the display of this embodiment does not have filter 203 shown in FIG. 3A. This embodiment is different from embodiment 3 in that uniformizing optical system 413 is provided, and that the filter is not provided, and the other configuration is same as in embodiment 3.

In the embodiment, laser light sources 305, 306, 307 are sequentially illuminated, and on the timing of changing over, the liquid crystal display panel 204 changes over the image to be displayed to the image of each color of R, G, B. Hence, full-color display is realized. In the embodiment, high speed is required when changing over the liquid crystal, but the number of pixels is increased three times, and display of high definition is easy. In the case of the conventional fluorescent tube, change-over of color or high speed switching was impossible, but the laser light sources 305, 306, 307 can change over at high speed, and R, G, B can be changed over easily.

Depending on the luminance of the image to be expressed, the intensity of the laser light sources 305, 306, 307 is modulated. As a result, the power consumption can be saved substantially. In the conventional fluorescent tube, intensity modulation at high speed was difficult, but the intensity modulation is easy in the laser light. By modulating the intensity of laser light depending on the maximum luminance of the screen to be displayed, the power necessary for emission of laser light 309 can be lowered substantially. When the conventional LED is used in the backlight of liquid crystal, it is hard to control the intensity of plural units of LED, and color changes due to intensity were significant, and gradation of output intensity was poor. By contrast, the laser light 309 is easy to control the gradation of intensity, and lower power consumption is realized.

Embodiment 5

Figure 5C:
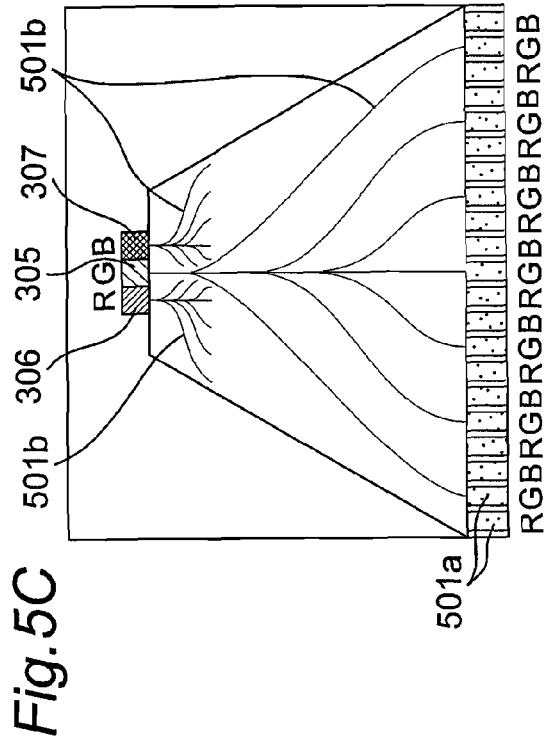
Figure 5A:
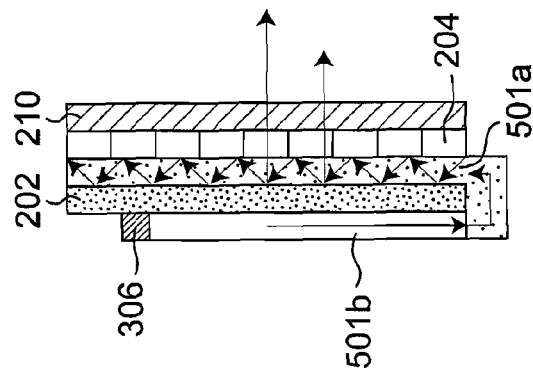

FIGS. 5A-5C shows a display in embodiment 5 of the invention. FIG. 5A is a side view of the display, FIG. 5B is a front view, and FIG. 5C is a back view. In this embodiment, instead of the waveguide plate 201 in embodiment 4 shown in FIG. 4A, a plurality of waveguide tubes 501a are provided. Instead of the waveguide plate 301, a plurality of branch waveguide tubes 501b are provided. The prism 310 is not provided. The other configuration is same as in embodiment 4. The waveguide plate 201 in embodiments 2 to 4 generates a planar light, but a linear light is generated in this embodiment by providing the waveguide tubes 501a and branch waveguide tubes 501b.

The plurality of branch waveguide tubes 501b are provided at the back side of the diffusion plate 202, and are extended from laser light sources 305, 306, 307 to the waveguide tubes 501a so as to make a trapezoidal shape. The light from the laser light sources 305, 306, 307 is separated according to each wavelength by the plurality of branch waveguide tubes 501b, and enters one of the waveguide tubes 501a.

The plurality of waveguide tubes 501a are provided between the liquid crystal display panel 204 and diffusion plate 202 as shown in FIG. 5A. The waveguide tubes 501a are in a shape extended toward the width direction of liquid crystal display panel 204 as shown in FIG. 5B, and are arranged in parallel in the longitudinal direction of the liquid crystal display panel 204. The plurality of waveguide tubes 501a guide the laser light of red, green or blue color separated by the branch waveguide tubes 501b according to each wavelength. The laser light propagating in the waveguide tubes 501a is scattered by the diffusion plate 202 provided at the back side of the waveguide tubes 501a, and part of the R, G, B light scattered by the diffusion plate 202 is supplied into each pixel of the liquid crystal display panel 204. Thus, full-color image is formed.

In the embodiment, the laser light is separated with respect to each wavelength by the branch waveguide tubes 501b, and the laser light is guided into waveguide tubes 501a, and a filter for selecting the wavelength is not needed.

In this embodiment, by providing waveguide tubes 501a, the crosstalk of pixels can be reduced, and an image of high contrast is realized.

The guided light to the waveguide tubes 501a may be also diverged by plastic fibers instead of the branch waveguide tubes 501b. Or the laser light diverged by plastic fibers may be guided into the branch waveguide tubes 501b.

Embodiment 6

Figure 6B:
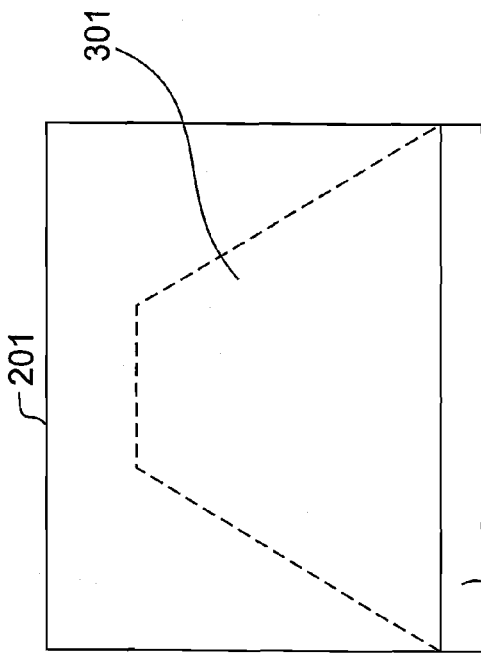
FIGS. 6A, 6B and 6C are configuration diagrams of a display in embodiment 6 of the invention.
Figure 6C:
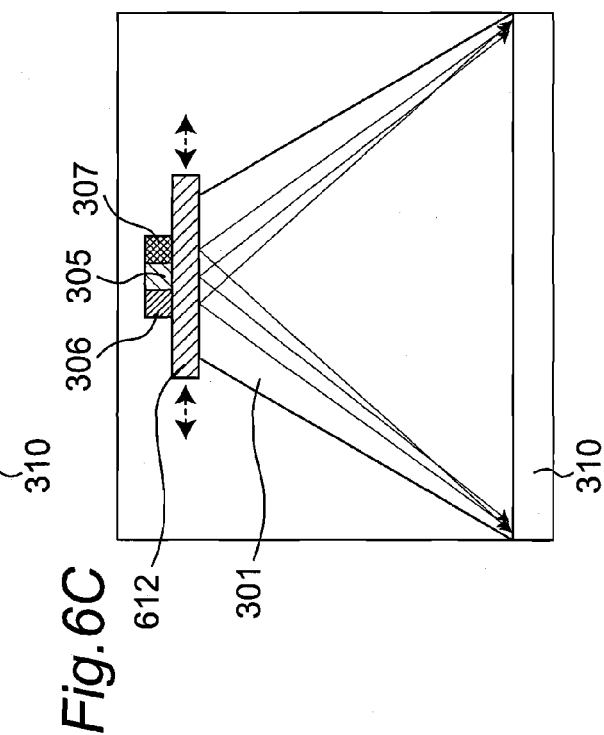
Figure 6A:
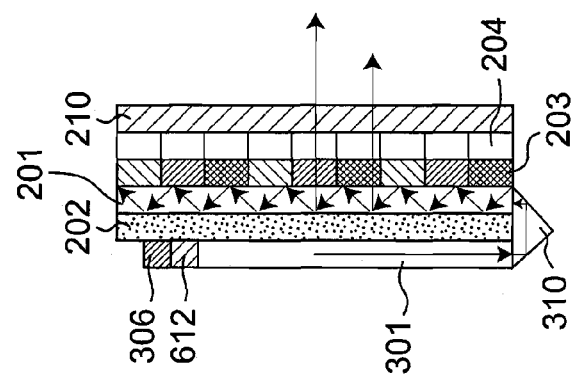

FIGS. 6A-6C shows a display in embodiment 6 of the invention. FIG. 6A is a side view of the display, FIG. 6B is a front view, and FIG. 6C is a back view. The display of this embodiment has a diffusion plate 612 provided between the laser light sources 305, 306, 307 and the waveguide plate 301. The other configuration is same as in embodiment 3.

The laser light from laser light sources 305, 306, 307 is high in coherence, and speckle noise by light interference occurs. When the image is formed by this laser light, the image quality is lowered. To prevent this problem, it is important to reduce the speckle noise. In the embodiment, the position of diffusion plate 612 is changed depending on the time. For example, the diffusion plate 612 is moved mechanically. Or fine particles in the diffusion plate 612 are moved electrically, and state of diffusion is changed. As a result, interference pattern is changed. When the interference pattern is changed temporally, interference pattern looks overlapped to the human eye, and hence the interference pattern disappears visually. Thus, by changing the phase of the guided light temporally, speckle noise can be decreased.

According to the embodiment, in addition to the effects of embodiment 3, speckle noise can be decreased.

Embodiment 7

Figure 7B:
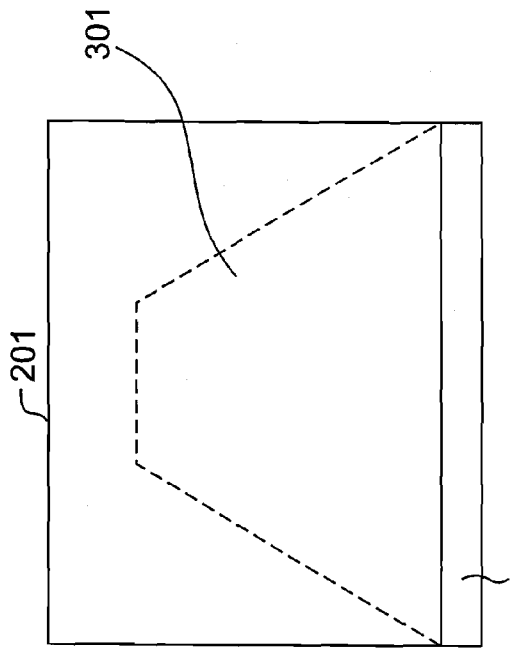
FIGS. 7A, 7B and 7C are configuration diagrams of a display in embodiment 7 of the invention.
Figure 7C:
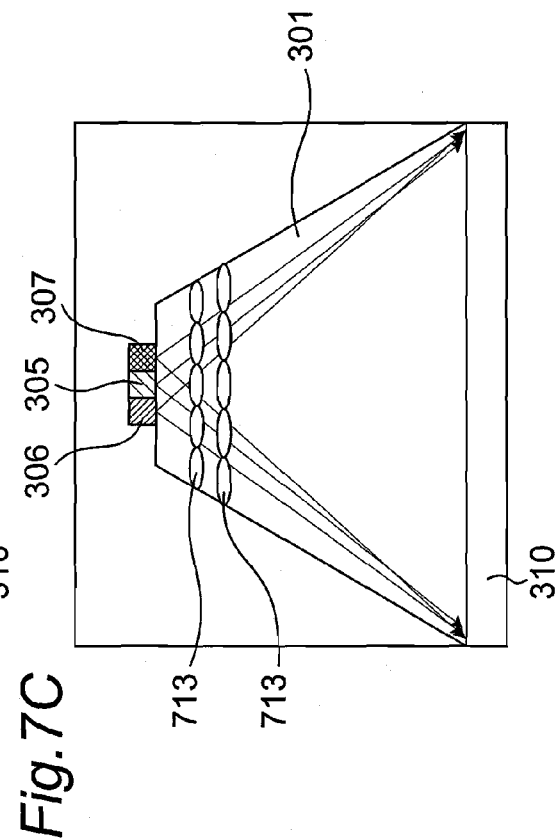
Figure 7A:
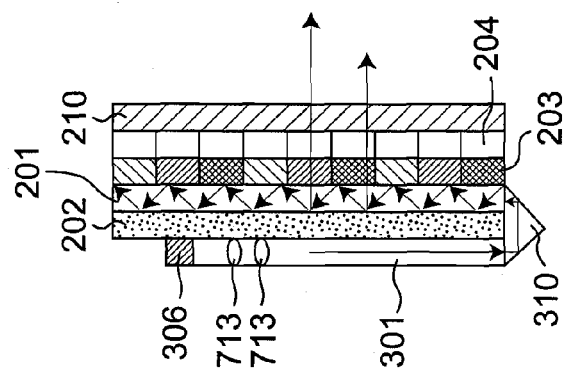

FIGS. 7A-7C shows a display in embodiment 7 of the invention. FIG. 7A is a side view of the display, FIG. 7B is a front view, and FIG. 7C is a back view. The display of this embodiment has other structure for decreasing the speckle noise. A liquid crystal element 713 is provided in the waveguide plate 301 as shown in FIGS. 7A and 7C, and the refractive index of the liquid crystal element 713 is changed depending on the time. The other configuration is same as in embodiment 3. By changing the refractive index of the liquid crystal element 713 in time, the wave surface of the light propagating in the waveguide plates 301, 201 can be changed in time, and speckle noise is decreased.

By disposing the liquid crystal element 713 in the waveguide plate 301, the power density of laser light can be lowered. Damage of liquid crystal is decreased. The reliability is enhanced. By applying an electric field from above and beneath the waveguide plate 301, the refractive index of liquid crystal element 713 can be controlled, and speckle noise can be decreased in a simple structure.

The liquid crystal element 713 may be disposed between the waveguide plate 301 and laser light sources 305, 306, 307 instead of in the waveguide plate 301. Or the liquid crystal element 713 may be also disposed in the waveguide plate 201. Also when the liquid crystal element 713 is disposed in the waveguide tubes 501*a* or branch waveguide tubes 501*b* in FIGS. 5A-5C, same effects of decreasing the speckle noise are obtained.

The liquid crystal element 713 may be also replaced by an optical element capable of modulating at least one of polarization, deflection and focal point of laser light.

Embodiment 8

FIGS. 8A-8C shows a display of other embodiment for decreasing the speckle noise. FIG. 8A is a side view of the display, FIG. 8B is a front view, and FIG. 8C is a back view. The display of this embodiment has a plurality of laser light sources 805 according to each wavelength. The laser light sources 805 emit laser light of red, green and blue colors, respectively. The laser light beams from the plurality of laser light sources 805 enter the waveguide plate 301.

By emitting laser light beams from luminous points of the plurality of laser light sources 805, a complicated wave surface is made, and speckle noise is suppressed. Outputs from the plurality of laser light sources 805 are changed over and used. As a result, interference patterns are multiplexed, and speckle noise is decreased.

Further, the wavelengths of the plurality of laser light sources 805 are slightly different. As a result, speckle noise is further decreased. Difference in wavelength is preferred to be 0.2 nm or more, or preferably 1 nm or more.

By using the plurality of laser light sources 805, if the intensity of one laser light is small, a display of high luminance is realized. By providing the plurality of laser light sources 805, the emission intensity of laser light from one laser light source 805 may be lowered in luminance, and the life of laser light sources 805 is extended substantially. By using the plurality of laser light sources 805, if one light source is broken, other light sources can compensate for loss, and a device of high reliability is realized.

As the laser light sources 805, various structures may be used, such as semiconductor laser of multiarray, stacking of semiconductor lasers of multiarray, and an arrangement of a plurality of laser chips.

When using semiconductor laser as laser light sources 805, by superposing a high frequency on driving current, the laser oscillation spectrum is widened. By widening the spectrum, the coherence can be reduced, and the speckle noise is decreased.

When using semiconductor laser as laser light sources 805, preferably, the plurality of laser light sources 805 are disposed at spacing of about 10 mm or more. In order to illuminate the liquid crystal display panel 204 by semiconductor laser, the output of each laser light source 805 is required to be several watts, and an electric power of about 10 W is needed per color as power consumption of laser light source 805. On the other hand, the output drop of the semiconductor laser is obvious in high temperature operation, and the life is shortened if operated at high temperature. Accordingly, the operating temperature of semiconductor laser is preferred to be 60 degree or less. Since the liquid crystal display panel 204 has relatively large area, by disposing the laser light sources at a mutual spacing of about 10 mm or more, mutual heat interference of adjacent laser light sources can be substantially suppressed. The semiconductor laser light source has small emission area, and by suppressing the power consumption per light source to 2 W or less or preferably 1 W or less, mutual heat interference of adjacent laser light sources can be suppressed notably. Thus, by disposing the laser light sources 805 at the back side of the liquid crystal display panel 204 at a proper interval, and by suppressing the power consumption of each laser light source 805 to 1 W or less, the heat loss effect is enhanced, and the operating temperature of the laser light sources can be kept at 60 deg. C or less. It is hence possible to drive the semiconductor laser with air cooling, and a high reliability is realized.

Embodiment 9

Figure 9:
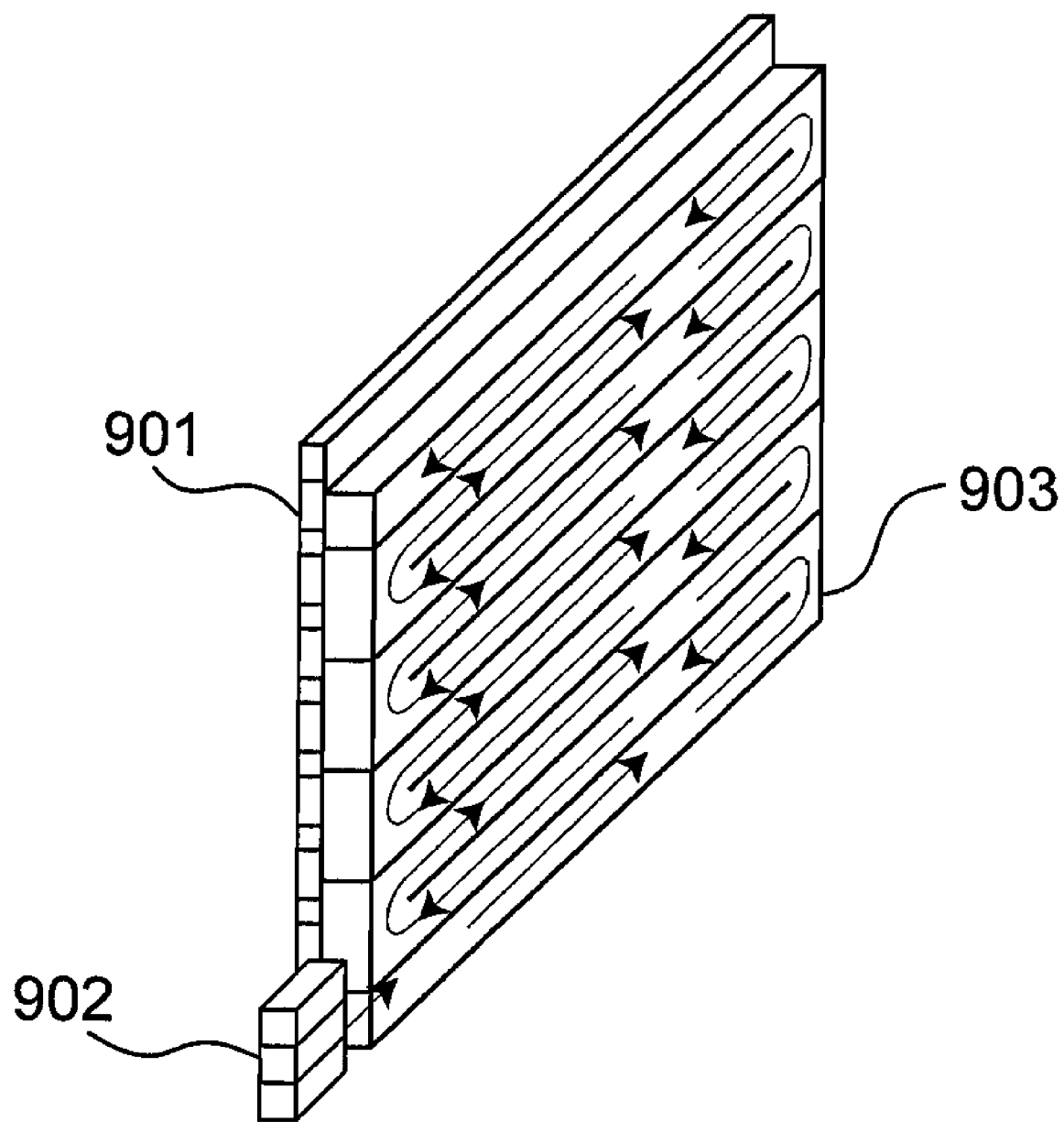
FIG. 9 is a configuration diagram of a display in embodiment 9 of the invention.

FIG. 9 shows a display in embodiment 9 of the invention. The display of this embodiment includes a liquid crystal display panel 901, a waveguide 903 of tube type provided at the back side of the liquid crystal display panel 901, and an RGB light source 902 as laser light source provided at one end of the waveguide 903. The waveguide 903 is made of three tubes which guide laser light of red, green and blue colors from the RGB light source 902. The waveguide 903 is folded at both ends of the liquid crystal display panel 901. At the back side of the waveguide 903, a diffusion plate (not shown) is formed, and the laser light propagating in the waveguide 903 is scattered to the liquid crystal display panel 901 side.

In the embodiment, the RGB light source 902 lights up the laser light of R, G, B sequentially, and changes over the screens of liquid crystal. An image of high quality is realized. The liquid crystal display panel 902 may be also provided with a wavelength plate, and light of desired wavelength may be also supplied to each pixel.

According to the display of the embodiment having the waveguide 903, crosstalk of each pixel is reduced same as in embodiment 5, and an image of high contrast is realized.

Embodiment 10

FIGS. 10A-10C show a display in embodiment 10 of the invention. FIG. 10A is an outline side view of the display, FIG. 10B is a front view, and FIG. 10C is a side view of extracting the portion of layer of the waveguide plate 201. In the embodiment, the waveguide plate 201, diffusion plate 202, filter 203, liquid crystal display panel 204, and polarizer 210 shown in FIG. 10A are same as those in embodiment 2 shown in FIG. 2A.

The display of this embodiment has a waveguide tube 1001 disposed at the lateral side in longitudinal direction of the waveguide plate 201, and a diffusion plate 1008 disposed at the lateral side in longitudinal direction of the waveguide tube 1001 as shown in FIGS. 10B and 10C. Laser light sources 1005, 1006, 1007 are provided at the lateral side in the width direction of the waveguide tube 1001.

The laser light 1009 entering from the side of the waveguide tube 1001 propagates in the waveguide tube 1001 while being reflected totally, and is diffused by the diffusion plate 1008. The diffused light propagates in the waveguide plate 201. As a result, the laser light 1009 propagating in the waveguide tube 1001 is made uniform.

Since the waveguide tube 1001 is provided and the laser light is provided to enter from the side of the waveguide tube 1001, the optical system for uniformizing the laser light 1009 is reduced in size.

Embodiment 11

FIGS. 11A-11C show a display in embodiment 11 of the invention. FIG. 11A is an outline side view of the display, FIG. 11B is a front view, and FIG. 11C is a part of side view including the waveguide plate 201. As shown in FIGS. 11B and 11C, in the display of the embodiment, a waveguide tube 1101 is disposed at the back side of the waveguide plate 201 across a diffusion plate 202. The waveguide plate 201 and the waveguide tube 1101 are coupled by way of a rectangular prism 310. A diffusion plate 1108 is provided at the lateral side in longitudinal direction of the waveguide tube 1101. Other configuration of the embodiment is same as in embodiment 10.

Laser light sources 1005, 1006, 1007 for emitting laser light 1009 of green, red, and blue colors are provided at the lateral side in the width direction of the waveguide tube 1101. The laser light 1009 entering the lateral side in width direction of the waveguide tube 1101 propagates in the waveguide tube 1101 while being reflected totally, and is diffused by the diffusion plate 1108. The laser light 1009 diffused by the diffusion plate 1108 propagates in the waveguide plate 201 through prism 310.

By disposing the waveguide tube 1101 at the back side of the waveguide plate 201, as compared with the display shown in FIGS. 10A-10C, the size is further reduced.

In the embodiment, the waveguide plate 201 and the waveguide tube 1101 are coupled through the rectangular prism 310, but by applying an optical wiring using flexible waveguide tube made of organic material, the waveguide plate 201 and the waveguide tube 1101 may be coupled directly without using the rectangular prism 310. When a flexible material is used for the waveguide tube 1101, the degree of freedom of shape is increased. The wiring is easier. Lower cost and smaller size are realized. It is particularly effective when this structure is used in a portable appliance desired to be reduced in size. Not only the waveguide tube 1101, but also the waveguide plate 201 may be also made of a flexible material including organic material. By using the flexible material, the display design can be changed freely, and it is applicable to a wearable display expected in future.

Embodiment 12

FIGS. 12A-12C show a display in embodiment 12 of the invention. FIG. 12A is an outline side view of the display, FIG. 12B is a front view, and FIG. 12C is a side view of extracting the portion of layer of the waveguide plate 201. In the embodiment, the waveguide tube 1201 is tapered in shape. Other configuration is same as in embodiment 10. The taper is formed so that the width may be broader at the incident side of laser light 1009 (left side in FIG. 12B), and narrower as going away from the incident side (to the propagation direction) (to the right side in FIG. 12B). The diffusion plate 1208 is disposed at the lateral side in longitudinal direction of the waveguide tube 1201 along the tapered shape of the waveguide tube 1201.

The laser light 1009 propagating in the waveguide tube 1201 is radiated to the waveguide plate 201, and the light usually attenuates in the course of propagation. Accordingly, the light radiated to the waveguide plate 201 in running direction tends to be weaker. By shaping the taper of waveguide tube 1201 as in the embodiment, the radiation amount from the waveguide tube 1201 to the waveguide plate 201 can be made constant. By shaping the taper of waveguide tube 1201, distribution of light propagating from the waveguide tube 1201 to the waveguide plate 201 can be made uniform.

Embodiment 13

Figure 13C:
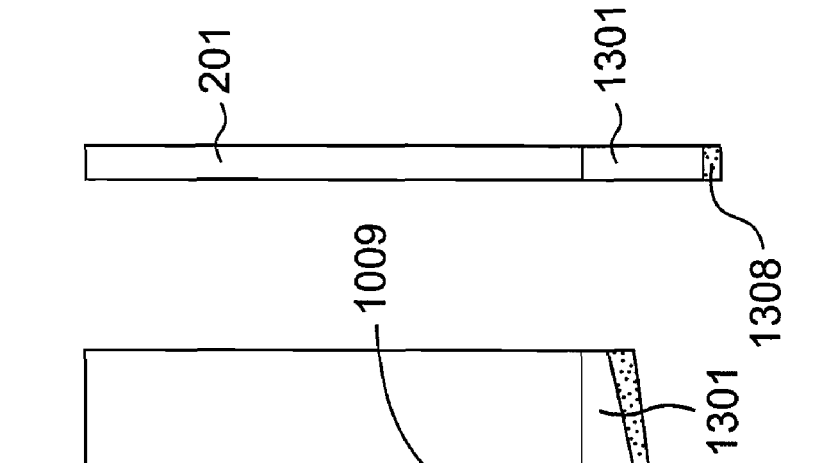
FIGS. 13A, 13B and 13C are configuration diagrams of a display in embodiment 13 of the invention.
Figure 13B:
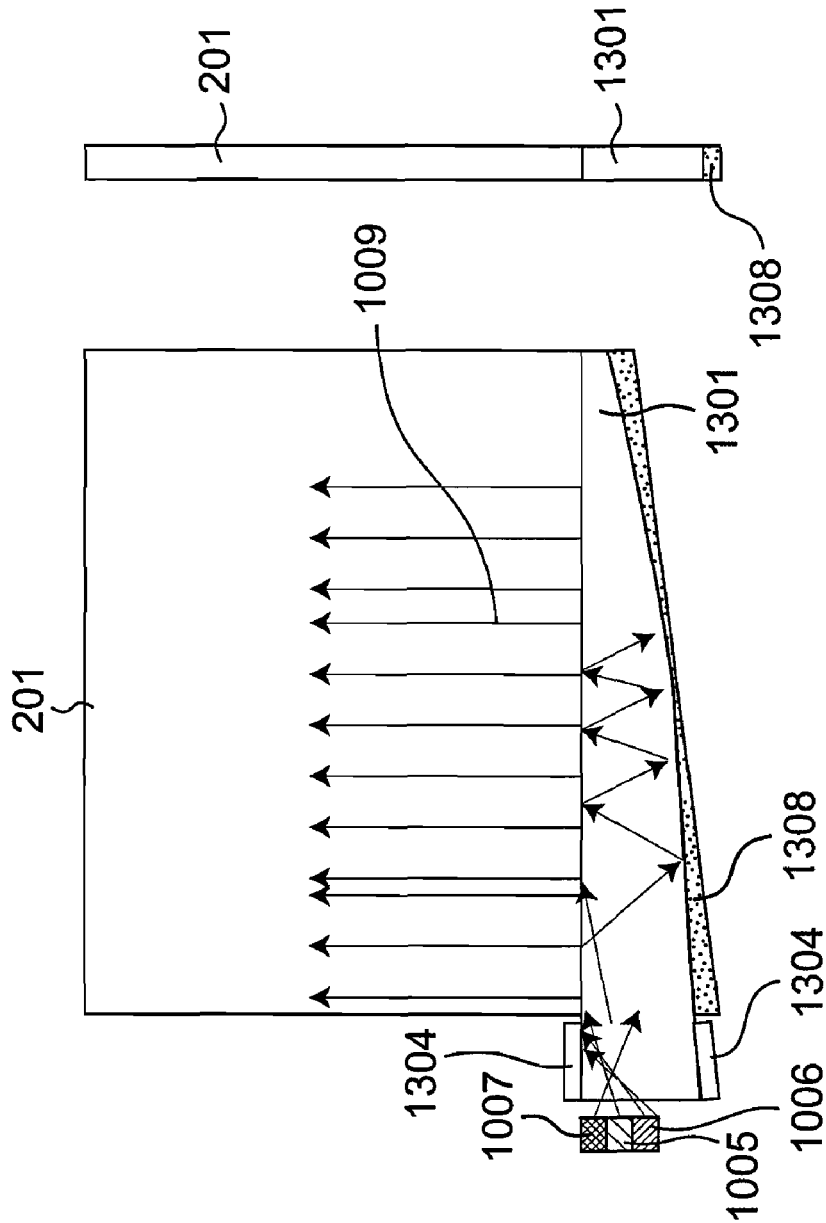
Figure 13A:
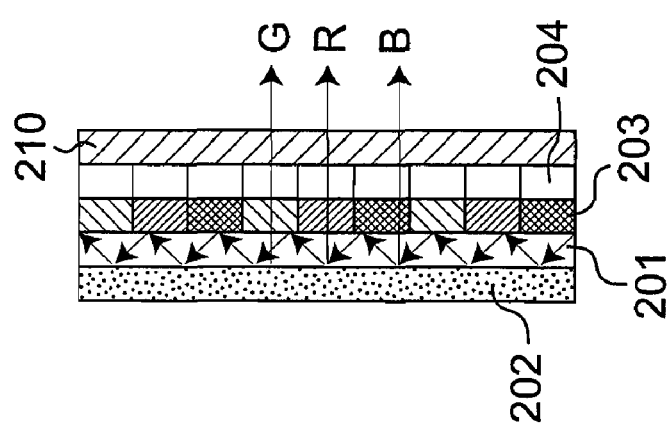

FIGS. 13A-13C show a display in embodiment 13 of the invention. FIG. 13A is an outline side view of the display, FIG. 13B is a front view, and FIG. 13C is a side view of extracting the portion of layer of the waveguide plate 201. In the embodiment, the waveguide tube 1301 is formed in a curbed taper shape. The curvature shape of the taper is determined on the basis of combination of diffusion coefficient of diffusion plate 1308 and taper shape, so that the light quantity of laser light 1009 radiated to the waveguide plate 201 may be uniform. By tapering the shape of the waveguide tube 1301 in curvature as in the embodiment, diffusion to the waveguide plate 201 may be more uniform.

The diffusion plate 1308 is disposed at the lateral side in longitudinal direction of the waveguide tube 1301 having a curvature taper. Surface roughness of the diffusion plate 1308 is formed to vary toward the propagation direction. As a result, the diffusion amount to the waveguide plate 201 can be adjusted, and the light quantity is made uniform.

As shown in FIG. 13B, the length of the waveguide tube 1301 in longitudinal direction is longer than the length of the waveguide plate 201 in longitudinal direction. The light emitted from laser light sources 1005, 1006, 1007 is reflected at the lateral side of the waveguide tube 1301 and is made uniform, but a sufficient guiding distance is needed for making uniform. By setting the length of the waveguide tube 1301 longer than the length of waveguide plate 201, the laser light in the waveguide tube 1301 can be made uniform.

The display of the embodiment has a mirror 1304 disposed at the lateral side of the waveguide tube 1301 in the portion longer than the waveguide plate 201. By providing this mirror 1304, loss of light leaking from the waveguide tube 1301 is decreased, and the power consumption can be saved.

This embodiment is the same as embodiment 12 in FIGS. 12A-12C except that the waveguide tube 1301 is formed in a curved taper shape, and that the mirror 1304 is provided.

In embodiment 12 and embodiment 13, the waveguide tubes 1201, 1301 are disposed at the lateral side in longitudinal direction of the waveguide plate 201, but, as in embodiment 11, the waveguide tubes 1201, 1301 may be disposed at the backside of the waveguide plate 201, so that the surface area of display can be reduced.

Embodiment 14

FIGS. 14A-14C show a structure for monitoring the laser light. FIG. 14A is an outline side view of the display, FIG. 14B is a front view, and FIG. 14C is a side view of extracting the portion of layer of the waveguide plate 201. The display of the embodiment further includes, in addition to the configuration of embodiment 13, detectors 1405, 1406 for detecting the light quantity of laser light, a diffraction element 1402 for separating the R, G, B light beams, and a drive circuit 1403 for controlling the light intensity of laser light source on the basis of detection results from detectors 1405, 1406.

In the invention characterized by using R, G, B laser light emitted from laser light sources 1005, 1006, 1007 for the backlighting of liquid crystal display panel 204, in addition to in-plane uniformity of light, what is important is the stability of light intensity and the adjustment of ratio of light quantity of R, G, B due to wavelength variations. The in-plane uniformity of light can be realized in the configuration in embodiments 1 to 13.

To stabilize the light intensity, it is necessary to stabilize the balance of R, G, B wavelengths, and the output of light. As shown in FIG. 14B, in the embodiment, the detector 1406 is provided at the lateral side of the waveguide tube 1301. The detector 1406 monitors the light wavelength intensity of output side of the waveguide tube 1301. The monitor result is fed back to the drive circuit 1403 of the display. The intensity of light is controlled to be stabilized. A wavelength filter or diffraction element may be provided before the detector 1406, and the detector 1406 may detect the intensity of R, G, B wavelengths of laser light.

The detector 1406 may be also disposed in part of the waveguide tube 1301, or outside of the waveguide tube 1301. When the detector 1406 is disposed outside, it is effective for uniformizing the light quantity of the guided light. When uniformizing the distribution of light propagating in the waveguide tube 1301 by using a plurality of laser light sources, it is necessary to control the output of each light source so as to uniformizing the light distribution. Hence, a photodetector array is used as the detector 1406, and the diffraction light from the diffraction element provided before the detector 1406 is detected by the photodetector array. Accordingly, the in-plane uniformity of guided light can be controlled. By controlling the light quantity of each one of the plurality of laser light sources so as to uniformizing the quantity of monitored light, the in-plane uniformity of light quantity of guided light is enhanced.

In other monitoring method of light intensity, photodiodes may be provided in laser light sources 1005, 1006, 1007. A specific output is obtained from the feedback circuit, and the output may be stabilized.

Control about wavelength fluctuations of light sources is explained. When using the laser light sources 1005, 1006, 1007, the wavelength of light may be changed depending on the environmental conditions. The wavelength fluctuation may deteriorate, for example, color reproducibility realized by balance of each light quantity of R, G, B. That is, when reproducing a same color, the ratio of intensity of light of R, G, B differs by wavelength fluctuations. To avoid this inconvenience, the display of the embodiment monitors the wavelength of laser light sources 1005, 1006, 1007 by the detector 1405, and controls the ratio of intensity of R, G, B for color reproducibility depending on wavelength variations.

In the laser light sources 1005, 1006, 1007, the diffraction element 1402 is provided at the position of opposite side of the waveguide tube 1301 (left side in FIG. 14B), and the detector 1405 for detecting wavelength deviation of laser light source is provided at the position of rear side of the diffraction element 1402. The detector 1405 makes use of the phenomenon that the diffraction of light by diffraction element 1402 differs depending on the wavelength, and detects each light of R, G, B separated by the diffraction element 1501. The drive circuit 1403 controls the intensity of light of laser light sources 1005, 1006, 1007 so that the ratio of light quantity of each light source may be constant, on the basis of detection result of the detector 1405.

In particular, it is important to detect wavelength fluctuations of light by red and blue lasers light sources. Wavelength fluctuations of red color and blue color have a large influence on color reproducibility, and color balance by wavelength fluctuations is likely to be broken. Accordingly, wavelength fluctuations are monitored at least about red color and blue color.

The drive circuit 1403 of the display in the embodiment adjusts the laser power or controls the transmissivity of liquid crystal according to the wavelength fluctuations of laser light detected by the detector 1405. Hence, color reproducibility is enhanced.

In the display of the embodiment, the wavelength detector 1405 is arranged at the opposite side position of the laser light sources 1005, 1006, 1007 from the waveguide tube 1301, but the detector 1405 may be also provided in the waveguide tube 1301 or the waveguide plate 201.

The configuration of using the detectors 1405, 1406 is not limited to this embodiment, but may be applied also in embodiment 10 to embodiment 12.

The display explained in embodiment 1 to embodiment 14 is designed to display an image by using laser light source, and an image of high definition and high color is realized. The display of the invention is useful for liquid crystal display of wide screen. The laser emitting means including the laser light source is coupled to a screen such as liquid crystal display panel 204, and by limiting the radiating direction, the laser light is perfectly prevented from being directly radiated to other object than the screen. Hence, when the display of the embodiments is used in mobile applications, the safety is assured. A small, portable and safe display of low power consumption is realized.

A planar illuminator has the similar structure of the display in embodiment 1 to embodiment 14, but does not include the filter 203 and liquid display panel 204. In the display in embodiment 1 to embodiment 14, the illuminator is explained as backlighting of liquid crystal display, but the illuminator may be used in other applications than the backlighting. The illuminator may be used as a lighting device. For example, when the planar illuminator is used in indoor wall or ceiling, a lighting device of low power consumption is realized. Further, having the light in R, G, and B wavelengths and by varying the intensity distribution, color temperature of white color or full-color lighting device can be realized. By installing the liquid crystal element 713 in FIGS. 7A-7C in the lighting device, and changing the polarization, deflection and focus of the laser light depending on the time, a lighting device capable of suppressing speckle noise can be realized. By superposing a high frequency on the light source, the coherence of laser light is lowered, and speckle noise can be decreased. As shown in FIGS. 8B and 8C, by installing a plurality of laser light sources 805 in the lighting device, light is emitted to the waveguide plate from different luminous points, so that speckle noise is decreased. Or as shown in FIG. 9, when the illuminator has a flexible waveguide 903 of tube type, an irradiating plane, irradiating pair, or irradiating area of desired shape can be formed. As shown in FIGS. 11B and 11C, further, by combining the waveguide tube 1101 and the waveguide plate 201, a planar illuminator can be made. The illuminator of the invention can emit a planar light at low power consumption, and its practical effect is outstanding.

INDUSTRIAL APPLICABILITY

The display of the invention has effects of irradiating the liquid crystal display panel with light of uniform light quantity distribution, and is very useful for a large size of display or a display for portable use. The illuminator of the invention can irradiate anything with light of a uniform light quantity distribution, and is hence very useful for lighting device or the like.

The invention claimed is:

1. A display comprising:
a liquid crystal display panel;
a laser light source that emits laser light having wavelengths of red, blue and green;
a first waveguide plate arranged at a back side of the liquid crystal display panel, the first wave guide plate being capable of performing multiple reflection of the laser light;
a diffusion plate arranged at the back side of the first waveguide plate, the diffusion plate being capable of diffusing the laser light propagating in the first waveguide plate to emit the laser light toward the liquid crystal display panel; and
a reflection film arranged at a lateral side of the first waveguide plate, the reflection film reflects the laser light, wherein:
a plurality of entrances, not covered by the reflection film, is provided in part of the lateral side of the first waveguide plate;
the laser light enters the first waveguide plate through at least one of the entrances;
a film reflecting light, other than specific light, is formed on each of the entrances; and
each laser light, having wavelength of red, blue or green, enters a different one of the entrances through the film.

2. A display comprising:
a liquid crystal display panel;
a laser light source that emits laser light having wavelengths of red, blue and green;
a first waveguide plate arranged at the back side of the liquid crystal display panel, the first waveguide plate being capable of performing multiple reflection of the laser light;
a diffusion plate arranged at the back side of the first waveguide plate, the diffusion plate being capable of diffusing the laser light propagating in the first waveguide plate to emit the laser light toward the liquid crystal display panel;
a second waveguide plate arranged at the back side of the diffusion plate, wherein the laser light of the laser light source enters the second waveguide plate and then enters the first waveguide plate through the second waveguide plate; and
an optical element that modulates at least one of polarization, deflection and focal point of the laser light, wherein at least one of polarization, deflection and phase of the laser light is changed temporally, and the optical element is formed as part of the first waveguide plate or the second waveguide plate.

3. A display comprising:
a liquid crystal display panel;
a laser light source that emits laser light having wavelength regions of red, blue and green;
a plurality of first waveguide tubes arranged at a back side of the liquid crystal display panel, which propagates the laser light emitted from the laser light source for each wavelength; and
a diffusion plate arranged at a back side of the plurality of the first waveguide tubes, the diffusion plate being capable of diffusing the laser light propagating in the first waveguide tubes to emit the laser light toward the liquid crystal display panel.

4. The display according to claim 3, further comprising a plurality of second waveguide tubes arranged at a back side of the diffusion plate, wherein the second waveguide tubes separate the laser light of red, blue and green emitted from the laser light source based on each wavelength to allow each separated laser light into each one of the plurality of the first waveguide tubes.

5. The display according to claim 3, wherein:
the plurality of first waveguide tubes includes three waveguide tubes each propagating the laser light of red, green or blue, respectively; and
each waveguide tube is folded back at both ends of the liquid crystal display panel.

6. An illuminator comprising:
a laser light source that emits laser light having a plurality of different wavelengths;
a waveguide plate that performs multiplex reflection of the laser light;
a diffusion plate arranged at a back side of the waveguide plate, the diffusion plate being capable of diffusing the laser light propagating in the waveguide plate to emit the laser light from a surface of the waveguide plate; and
a reflection film arranged at a lateral side of the waveguide plate, the reflection film reflects the laser light, wherein:
a plurality of entrances, not covered by the reflection film, is provided in part of the lateral side of the waveguide plate;
the laser light enters the waveguide plate through at least one of the entrances;
a film reflecting light, other than specific light, is formed on each entrance; and
each laser light having wavelength of red, blue or green, respectively enters a different entrance through the film.

7. An illuminator comprising:
a laser light source that emits laser light having a plurality of different wavelengths;
a first waveguide plate that performs multiplex reflection of the laser light;
a diffusion plate arranged at a back side of the first waveguide plate, the diffusion plate being capable of diffusing the laser light propagating in the first waveguide plate to emit the laser light from a surface of the first waveguide plate;
a second waveguide plate arranged at a back side of the diffusion plate, wherein the laser light of the laser light source enters the second waveguide plate and then enters the first waveguide plate through the second waveguide plate; and
an optical element that modulates at least one of polarization, deflection and focal point of the laser light, wherein:
at least one of polarization, deflection and phase of the laser light is changed temporally; and
the optical element is formed as part of the first waveguide plate or the second waveguide plate.

* * * * *